United States Patent [19]
Cuesta et al.

[11] Patent Number: 5,563,494
[45] Date of Patent: Oct. 8, 1996

[54] METHOD OF MONITORING THE CHARGING OF SEALED NICKEL STORAGE CELLS, AND A CHARGER USING THE METHOD

[75] Inventors: Rosendo Cuesta, Saint Loubes; Christophe Rouverand, Colombes, both of France

[73] Assignee: Saft, Romainville, France

[21] Appl. No.: 70,871

[22] Filed: Jun. 3, 1993

[30] Foreign Application Priority Data

May 24, 1993 [FR] France ................... 93 06155

[51] Int. Cl.$^6$ .................. H02J 7/04; H02J 7/10
[52] U.S. Cl. ........................... 320/35; 320/20
[58] Field of Search ................. 320/35, 36, 38, 320/37, 20

[56] References Cited

U.S. PATENT DOCUMENTS

| | | | |
|---|---|---|---|
| 4,755,735 | 7/1988 | Inakagata | 320/35 |
| 5,166,596 | 11/1992 | Goedken | 320/35 |
| 5,204,611 | 4/1993 | Nor et al. | 320/39 |
| 5,241,259 | 8/1993 | Patino et al. | 320/35 |
| 5,302,887 | 4/1994 | Ishiguro et al. | 320/32 |

FOREIGN PATENT DOCUMENTS

| | | |
|---|---|---|
| 0473514A2 | 3/1992 | European Pat. Off. . |
| 0498715A1 | 8/1992 | European Pat. Off. . |
| 4-109833 | 4/1992 | Japan ................ 320/35 |
| 8902182 | 3/1989 | WIPO . |
| 9211680 | 7/1992 | WIPO . |

OTHER PUBLICATIONS

Patrick Gueulle, translation of article submitted with Information Disclosure Statement submitted on May 30, 1994.

Markus Bullinger, translation of article submitted with Information Disclosure Statement submitted on May 30, 1994.

Patrick Guelle, "Les Circuits Integres Pour Chargeurs Rapides", *Electronique Radio Plans*, No. 543 Feb. 1993, pp. 57–64.

Markus Bullinger, "Schnelladen Mit Intelligenz–Ein IC Steuert NiCd–und NiMH–Akkuladegerate", *Elektronik*, vol. 42, No. 6, 23 Mar. 1993, pp. 74–77.

*Primary Examiner*—Peter S. Wong
*Assistant Examiner*—Robert E. Nappi
*Attorney, Agent, or Firm*—Sughrue, Mion, Zinn, Macpeak & Seas

[57] ABSTRACT

A method of monitoring rapid charging of sealed nickel storage cells of the nickel-hydride type and of the nickel-cadmium type, said cells optionally being associated in a battery, wherein once said cells have been identified and a relationship for the heating of said cells as a function of charging time for a given charging mode has been determined and stored, the charging of said cells is stopped when the difference between the temperature of said cells and a reference temperature exceeds a predetermined value, the reference temperature being calculated on the basis of said heating relationship and as a function of the charging time that has already elapsed.

6 Claims, 3 Drawing Sheets

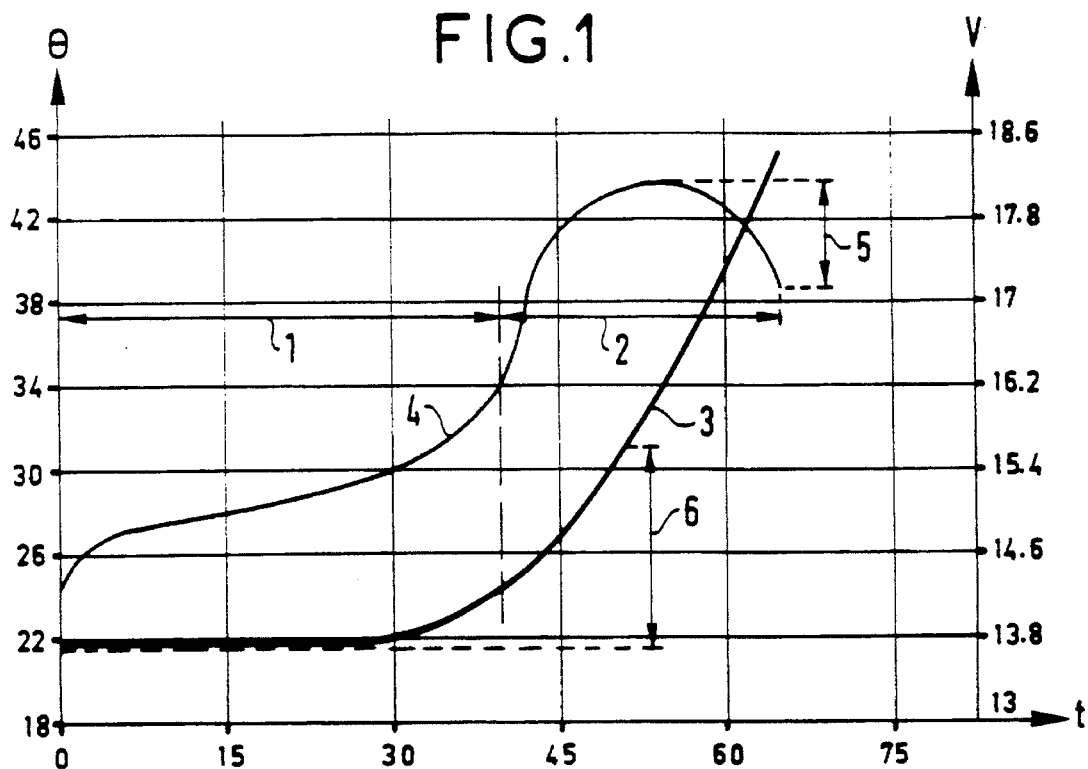
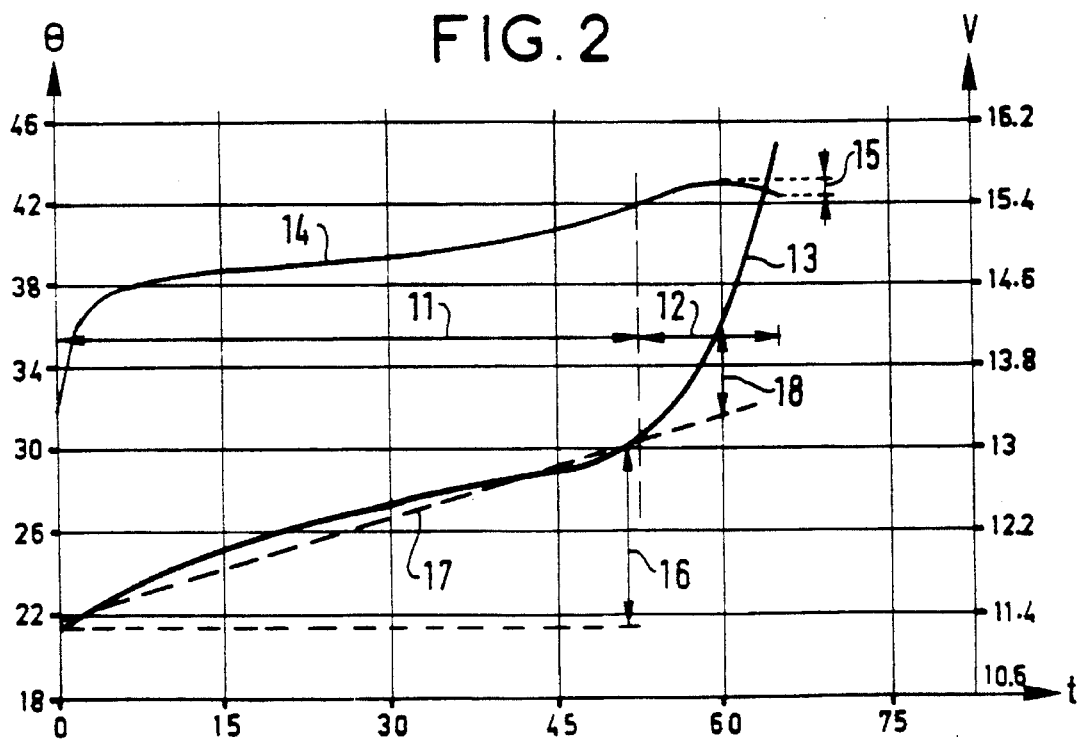

5,563,494

METHOD OF MONITORING THE CHARGING OF SEALED NICKEL STORAGE CELLS, AND A CHARGER USING THE METHOD

The present invention relates to a method of monitoring the charging of sealed nickel storage cells, which are generally connected as batteries. It relates in particular to batteries for portable applications such as video cameras, shavers, etc. . .

BACKGROUND OF THE INVENTION

At present, the most widespread sealed nickel storage cells are based on the nickel-cadmium (Ni—Cd) couple. They are charged fully at a high rate in two stages. The first stage of charging corresponds to oxidation-reduction of the active materials of the electrodes. Once all of the active material of the positive electrode has been transformed, the storage cell enters an overcharging stage. During this second stage, oxygen is evolved at the positive electrode. Recombination of the oxygen at the negative electrode raises the temperature, and has a secondary effect of lowering the voltage of the storage cell.

To ensure that the cell is fully charged, it is common practice to monitor changes in its voltage or in its temperature, with charging being stopped as soon as the change in voltage becomes negative or the temperature rises.

Recently, new sealed storage cells based on the nickel hydride (Ni—MH) couple have appeared on the market. In numerous applications they are designed to replace Ni—Cd cells. It is therefore essential to be able to use a single charger interchangeably with batteries containing either type of cell.

Unfortunately, the behavior of a nickel hydride cell during rapid charging is different from that of a Ni—Cd cell, in particular with respect to the following two points:

the charging stage is exothermal which means that the cell heats up continuously from the beginning of charging; and the amplitude of the negative change in voltage on beginning the overcharging stage is much smaller.

Furthermore, present knowledge shows that there is a direct relationship between total overcharged capacity and the lifetime of an Ni—MH cell. Accurate control of charging and minimizing the duration of the overcharging stage are therefore essential for obtaining best lifetime performance.

The methods used for detecting the end of charging in Ni—Cd cells are particularly difficult to apply properly with Ni—MH cells because the changes in the observed signals are so small.

OBJECTS AND SUMMARY OF THE INVENTION

The present invention relates in particular to a method enabling sealed nickel storage cells of the nickel-cadmium and of the nickel hydride type to be charged rapidly under good conditions of reliability and in compliance with the technical particularities of each type of cell. In addition, the method makes it possible to implement chargers that are suitable for use with batteries containing either type of cell.

The present invention provides a method of monitoring rapid charging of sealed nickel storage cells of the nickel-hydride type and of the nickel-cadmium type, said cells optionally being associated in a battery. Once said cells have been identified and a relationship for the heating of said cells as a function of charging time for a given charging mode has been determined and stored, the charging of said cells is stopped when the difference between the temperature of said cells and a reference temperature exceeds a predetermined value, the reference temperature being calculated on the basis of said heating relationship and as a function of the charging time that has already elapsed.

The cells may be charged at constant current or at a current that varies over time. The time required for a full charge lies in the range 30 minutes to 2 hours.

The heating relationship is determined as follows:

the change in the temperature of said cells during a charging operation is measured and recorded;

a mathematical expression is established giving temperature as a function of charging time; and the heating relationship for said cells during said charging operation is stored.

During charging, temperatures are measured successively at a selected time interval. These measured values are used to deduce the relationship governing variation of temperature as a function of time. This relationship depends mainly on the charging mode (constant current, . . . ), on charging conditions (charging current, . . . ), and on battery model (cell format, type of connection to make a battery, . . . ).

For example, when current is constant, the temperature of an Ni—MH cell varies linearly with time in application of a heating relationship of the form: $\theta(t)=\theta_0+f(t)$ where $\theta_0$ is the temperature of the cell at the beginning of charging and f(t) represents the increase in temperature as a function of time during the charging stage. As a general rule, the heating relationship defined for an Ni—MH cell becomes $\theta(t)=\theta_0$ for an Ni—Cd cell. Under such circumstances, the reference temperature of Ni—Cd cells is constant and equal to the temperature at the beginning of charging.

During charging, it suffices merely to measure the temperature of the cell periodically and to compare the measured temperature with a reference temperature calculated on the basis of the heating relationship to detect when the overcharging stage begins. Charging is stopped when the temperature difference is not less than a preprogrammed value that depends, in part, on the accuracy of the measurement means used.

It has been observed that the temperature change in cells entering the overcharging stage is reproducible and of similar magnitude for ambient temperatures lying in the range 0° C. to +50° C. The difference between the measured temperature and the reference temperature that marks the end of charging is +3° C. to +6° C. for Ni—MH cells and +10° C. to +15° C. for Ni—Cd cells. These values take account of the thermal insulation of the battery and of the selected charging current.

In a variant, prior to the beginning of charging, the method further includes a step consisting in verifying temperature stability of said cells, with charging being inhibited so long as the difference between a measured temperature and a stored earlier measured temperature is greater than a predetermined threshold value.

The charger analyzes heating dynamics before charging the cells. The charger performs a series of sequential measurements of cell temperature and it compares the measured temperatures with corresponding earlier temperatures that have been stored. The difference between a measured temperature and the stored earlier temperature is compared with a previously determined and stored threshold value. Cell charging is automatically delayed so long as temperature stabilization is not sufficient.

In an implementation of the method, a reference temperature satisfying said stored heating relationship is calculated for nickel-hydride type cells only, the temperature at the beginning of charging being taken as the reference temperature for nickel-cadmium type cells.

After the type of cell has been identified, compatibility with Ni—Cd cells may also be obtained by changing the heating relationship of the battery being charged.

The type of cell is identified by comparing the way in which the temperature measured at the beginning of charging varies relative to a predetermined relationship for temperature increase at beginning of charging. For example, after charging for a few minutes, the charger analyzes the temperature behavior of the battery relative to a previously stored relationship for temperature variation: if the measured temperature matches the stored relationship, then the cells are Ni—MH cells, otherwise they are Ni—Cd cells. However, the type of cell to be charged may be recognized by structural means: a mechanical keying arrangement; a special contact; etc.

The present invention also provides a charger that implements the method. The charger includes an electricity power supply system, a temperature sensor, means for converting temperature variations into voltage variations, a clock, means for storing said heating relationship, and a microprocessor. This charger is independent of battery voltage, and it may use different charging currents as a function of the capacity of the battery to be charged.

This method of monitoring charging is compatible with conventional safety systems (thermostats, reversible electronic fuses of the "polyswitch" type, etc.) that are used redundantly in addition to the main switching-off mode.

BRIEF DESCRIPTION OF THE DRAWINGS

Other characteristics and advantages of the present invention appear from the following description and examples that are naturally given by way of non-limiting illustration, and from the accompanying drawings, in which:

FIG. 1 shows changes in the voltage and the temperature of a battery of ten Ni—Cd cells during rapid charging at 20° C., charging being performed at a current C which corresponds to a cell being fully charged in 1 hour;

FIG. 2 is analogous to FIG. 1 but represents a battery of ten Ni—MH cells being charged under the same conditions; in both FIGS. 1 and 2, voltage V and temperature θ in ° C. are plotted as a function of time t in minutes;

Figure 4:
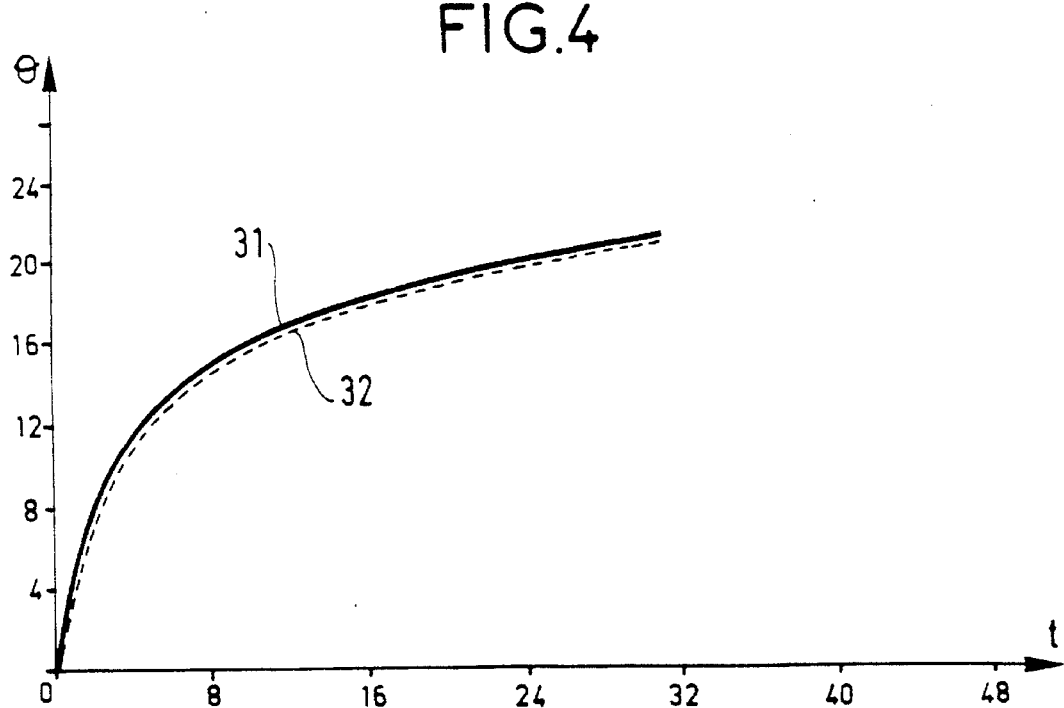
FIG. 4 shows how the temperature of two batteries of six Ni—Cd cells initially at 0° C. varies when they are placed under ambient temperature conditions.
Figure 5:
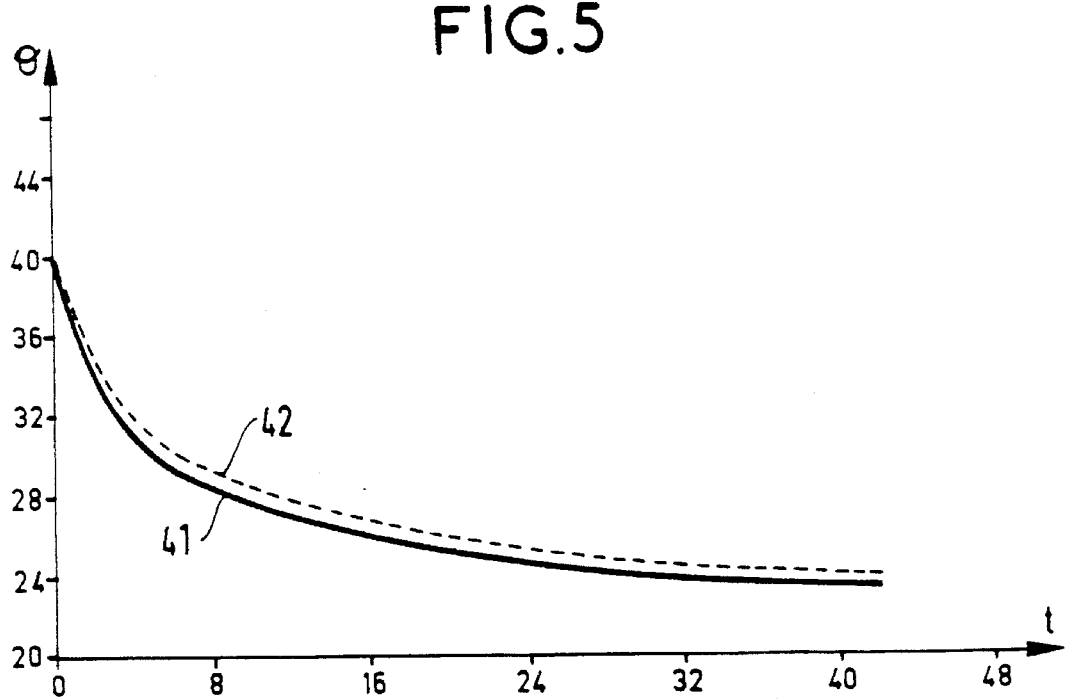
FIG. 5 is analogous to FIG. 4, but for an initial temperature of 40° C.

in both FIGS. 4 and 5 temperature θ in ° C. is plotted as a function of time t in minutes.

MORE DETAILED DESCRIPTION

Full charging of a battery of sealed Ni—Cd storage cells at a charging current of 1.2 A, as shown in FIG. 1 where curve 4 shows change in voltage and curve 3 shows change in temperature, comprises two stages:

a charging stage 1 during which charging proper takes place, and which corresponds to oxidation-reduction of the active materials of the electrodes; and a "overcharging" stage 2 which occurs when all of the active material of the positive electrode has been transformed. The electrical energy then delivered to the cell causes oxygen to be evolved at the positive electrode, which oxygen is then reduced at the negative electrode. This recombination reaction is exothermal, as demonstrated by curve 3 in FIG. 1. The increase 6 in temperature (+δθ) when changing from the charging stage to the overcharging stage has the secondary effect of a decrease 5 in cell voltage (−δV), as shown by curve 4 in FIG. 1.

In the prior art, charging is usually considered as being complete as soon as the voltage decrease (−δV) is −10 mV to −20 mV per cell or as soon as temperature rises at 0.3° C. to 0.8° C. per minute (+δθ/δt). In addition to the need for using sensors that are very sensitive and that have low inertia, that method suffers from the drawback of being particularly sensitive to temperature disturbances that can affect the surroundings during charging. For example, a battery at a temperature lower than the surrounding temperature may be the subject of a natural temperature rise of sufficient amplitude to be interpreted by the charger as indicating the end of charging. Similarly, a change in ambient temperature A.T. during charging (draughts, influence of a heater, etc . . . ) may have the same consequences. It is therefore essential to ensure temperature stability of the battery before beginning to charge it.

Use of the method of the present invention is illustrated for the charging of a battery of Ni—MH cells. During the charging stage 11 and the overcharging stage 12 of a rapid charge, the battery behaves in the manner shown in FIG. 2 where temperature (curve 13) and voltage (curve 14) are plotted as a function of time.

The behavior of a battery of Ni—MH cells differs from the above-described behavior of a battery of Ni—Cd cells, mainly with respect to the following two points:

the amplitude of the voltage decrease 15 (−δV) on leaving the charging stage 11 and entering the overcharging stage 12 is of much smaller amplitude, being about 0 mV to −5 mV per cell, which makes it difficult to measure and subject to external disturbances; in addition this signal becomes even smaller with increasing temperature or decreasing charging current, and no longer exists when charging at 40° C. or with a current of not more than C/2; and the charging stage 11 is exothermal (16), which means that battery temperature starts to increase from the beginning of charging (curve 13).

Thereafter, the rate of temperature rise +δθ/δt does increase on going from the charging stage 11 to the overcharging stage 12, to become about 0.3° C. per minute to about 0.8° C. per minute. This rate of temperature change is too small to be detected by prior art methods reliably over short measurement intervals, since that would require temperature changes of a few tenths of a degree to be detected.

According to the present invention, temperature change is recorded during a first charge and the heating relationship 17 for the model of battery in question is calculated and stored.

Before charging the same model of battery, temperature stability of the battery is ensured by measuring its temperature at regular intervals and by comparing the measured temperature with a preceding temperature taken as a reference. Battery charging is enabled only if the difference between the two temperatures is less than a threshold value, which means that the battery is in thermal equilibrium with its surroundings.

During battery charging, the temperature of the battery of cells is measured periodically and compared with the reference temperature for charging of identical duration and as calculated from the heating relationship 17 that has previously been stored. Charging is stopped when the difference between the temperature of the battery and the reference temperature reaches a predetermined value 18, which means that the battery has entered the overcharging stage 12. The predetermined value 18 is fixed in such a manner that the overcharging stage is as short as possible, given the accuracy of the measurement means used.

Figure 3:
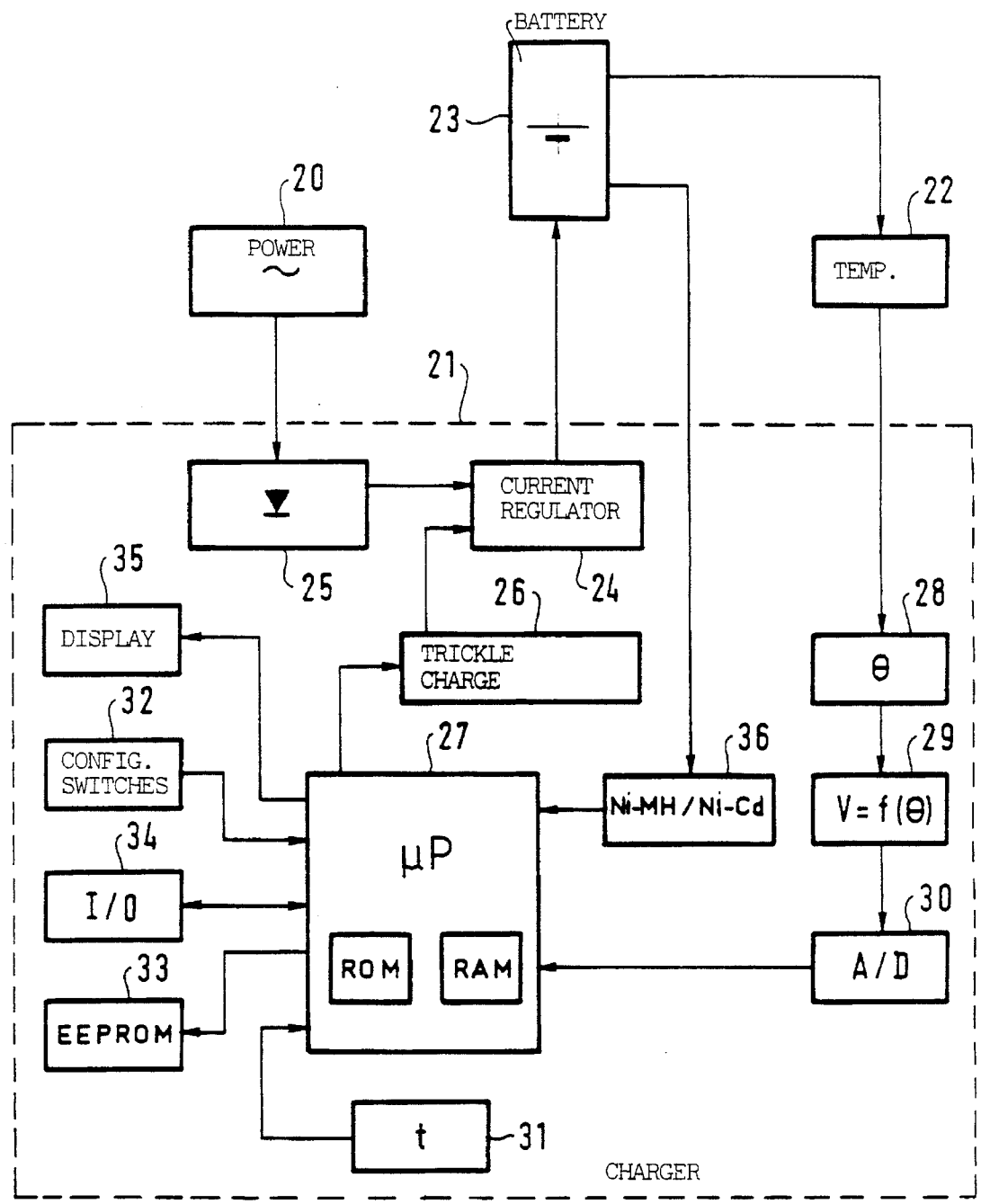
FIG. 3 is a block diagram of a charging circuit for a battery of nickel cells, the circuit including a power supply, a temperature probe, a charger, and a battery to be charged.

FIG. 3 is a block diagram of a battery charging circuit that includes an electricity power supply 20, a charger 21, a temperature probe 22, and a battery 23 of Ni—Cd or Ni—MH cells.

The battery 23 is charged at constant current by means of a current regulator 24. When current is taken from mains, the power supply 20 must include a transformer and a rectifier and filter circuit 25. As soon as rapid charging is over, a switch 26 goes over to maintenance or trickle charging. A microprocessor 27 associated with a temperature sensor 28 provided with a temperature probe 22 measures the temperature of the battery 23 at a given sampling frequency. An electronic circuit 29 converts temperature variations into voltage variations, and these analog values are in turn converted into digital values by a converter 30. The microprocessor 27 has read only memory (ROM) and random access memory (RAM), and under software control it determines the heating relationship for the battery being charged, beginning with the temperature of the battery and then the difference between the measured temperature and the reference temperature calculated from the heating relationship as a function of elapsed charging time as measured by a clock 31. The parameters of the heating relationship may either be configurable by switches 32 or else they may be stored in an electrical erasable programmable ROM (EEPROM) via an I/O interface 34. The result appears on a display 35.

EXAMPLE 1

In order to be able to track the heating of a battery of cells reliably, it is necessary to ensure temperature stability of the battery relative to its surroundings. FIGS. 4 and 5 are curves showing the rate of heating and of cooling for two batteries of six Ni—Cd cells of prismatic format (width 16.4 mm, thickness 5.6 mm), one being a GP4 model (height 48 mm) and the other being a GP6 model (height 67 mm). FIG. 4 shows the temperature of a GP4 battery (curve 31) and of a GP6 battery (curve 32) that were initially at 0° C. and that were then placed at ambient temperature. FIG. 5 shows how a GP4 battery (curve 41) and a GP6 battery (curve 42) cooled on being placed at ambient temperature, after being initially at 40° C.

For each battery, its temperature of rank N was measured once every 15 seconds, and was compared with its temperature of rank N-7, i.e. as measured 105 seconds earlier. Charging may begin only when the difference between these two temperatures is less than 0.35° C., which corresponds to temperature changing at less than 0.2° C./min. The threshold value is predetermined as a function of the accuracy of the means in the measurement system used, and in particular of the microprocessor 27.

EXAMPLE 2

According to the present invention, the charging of a battery 23 comprising ten sealed Ni—MH cylindrical cells of 4/5A format (height 42 mm, diameter 16.6 mm) can be monitored as follows.

The charger 21 performs periodic measurements of the temperature of the battery 23 at 15-second intervals. Each measured temperature of rank N is compared with the previously stored measured temperature of rank N-7. So long as the difference between the two compared values is greater than 0.35° C., charging of the battery 23 cannot begin. Once the threshold value has been reached, the battery 23 is put under charge with a current of 1.4 A, which corresponds to the battery being fully charged in 1 hour.

During a first charging operation, the charger 21 defines a relationship for the heating of the battery 23 which satisfies a mathematical equation of the form: $\theta(t) = \theta_0 + f(t)$, where $\theta_0$ is the temperature at the beginning of charging and where $f(t)$ represents a mathematical relationship for the increase in temperature as a function of time during charging stage 11. The heating relationship as determined in this way is stored in the charger 21 and it enables it at any instant to calculate a temperature reference value $\theta_r$ which depends solely on the duration of the charging that has already been performed.

During subsequent charging operations, the charger uses a temperature probe 22 immersed in the battery 23 to perform measurements of the real temperature $\theta_m$ at time intervals in the range a few seconds to 1 minute. Each measurement is then compared with the corresponding reference temperature $\theta_r$. The end of charging signal is obtained when the difference $18+\delta(\theta_m-\theta_r)$ between the measured temperature $\theta_m$ and the reference temperature $\theta_r$ as calculated by the charger 21 is positive and is greater than a fixed value. The following tables gives the end of charging values for voltage difference $-\delta V$, for rate of temperature change $+\delta\theta/\delta t$, and for difference from the heating relationship $+\delta(\theta_m-\theta_r)$ for charging in surroundings at three different ambient temperatures A.T.:

| A.T. (°C.) | $-\delta V$ (mV) | $+\delta\theta/\delta t$ (+C/min) | $+\delta(\theta_m - \theta_r)$ (°C.) |
| --- | --- | --- | --- |
| 0 | 0 | 0.8 | 6 |
| +20 | 0 | 0.9 | 5 |
| +40 | 0 | 0.9 | 6 |

It is clear that the parameter $+\delta(\theta_m-\theta_r)$ is the parameter whose threshold change of amplitude is the largest and which thus makes it possible to achieve maximum reliability in detection and greatest ease of implementation in the charger.

Naturally, the present invention is not limited to the embodiments described and shown, and numerous variants will occur to the person skilled in the art without going beyond the spirit of the invention. In particular, any means may be replaced by equivalent means without going beyond the ambit of the invention.

We claim:

1. A method of monitoring rapid charging of sealed nickel storage cells of a battery, all of the cells of said battery being one of nickel-hydride type and nickel-cadmium type, comprising the step of:

once said cells have been identified and a relationship for heating of said cells as a function of charging time for a given charging mode has been determined and stored, charging of said cells is stopped when a difference between a measured temperature of said cells and a reference temperature exceeds a predetermined value, the reference temperature being calculated on the basis of said heating relationship and as a function of the charging time that has already elapsed and of the temperature of said battery at the beginning of charging.

2. A method according to claim 1, wherein said heating relationship is determined as follows:

a change in the temperature of said cells during a charging operation is measured and recorded;

a mathematical expression is established giving temperature as a function of charging time based on the change and of the temperature of said battery at the beginning of charging; and the heating relationship for said cells during said charging operation is determined based on said mathematical expression and stored.

3. A method according to claim 1, wherein prior to beginning charging said cells, a step of verifying temperature stability of said cells is performed, so that charging of the cells is inhibited so long as a difference between the measured temperature and a stored earlier measured temperature is greater than a predetermined threshold value.

4. A method of monitoring rapid charging of sealed nickel storage cells of a battery, all of the cells of said battery being one of nickel-hydride type and nickel-cadmium type, comprising the step of:

once said cells have been identified and a relationship for heating of said cells as a function of charging time for a given charging mode has been determined and stored, charging of said cells is stopped when a difference between a measured temperature of said cells and a reference temperature exceeds a predetermined value, the reference temperature being calculated on the basis of said heating relationship and as a function of the charging time that has already elapsed, wherein the reference temperature is calculated for nickel-hydride type cells only, and a temperature at the beginning of charging is taken as a reference temperature for the nickel-cadmium type cells.

5. A method of monitoring rapid charging of sealed nickel storage cells of a battery, all of the cells of said battery being one of nickel-hydride type and nickel-cadmium type, comprising the step of:

once said cells have been identified and a relationship for heating of said cells as a function of charging time for a given charging mode has been determined and stored, charging of said cells is stopped when a difference between a measured temperature of said cells and a reference temperature exceeds a predetermined value, the reference temperature being calculated on the basis of said heating relationship and as a function of the charging time that has already elapsed, wherein the type of said cells is identified by comparing a change in temperature as measured during a predetermined period of time at the beginning of charging of said cells with a predetermined temperature increase representing the type of said cells.

6. A charger using the method according to claim 1, including:

an electricity power supply system which supplies power for charging said cells, a temperature sensor which senses the temperature of said cells, means for converting variations in the temperature of said cells as sensed by said temperature sensor into voltage variations, a clock for providing a timing, said temperature sensor senses the temperature of said cells at predetermined time intervals determined based on said timing, means for storing said heating relationship, and a microprocessor for controlling said charger to perform said method.

* * * * *